United States Patent
Visenski et al.

(10) Patent No.: US 7,373,421 B1
(45) Date of Patent: May 13, 2008

(54) METHOD AND APPARATUS OF PREVENTING PHYSICAL LAYER FROM ESTABLISHING UNSUPPORTED LINKS

(75) Inventors: Jason Visenski, San Ramon, CA (US); Chris Desiniotis, Fremont, CA (US)

(73) Assignee: Cisco Technology, Inc., San Jose, CA (US)

( * ) Notice: Subject to any disclaimer, the term of this patent is extended or adjusted under 35 U.S.C. 154(b) by 953 days.

(21) Appl. No.: 10/460,939

(22) Filed: Jun. 12, 2003

(51) Int. Cl.
*G06F 15/16* (2006.01)
(52) U.S. Cl. .................... 709/237; 370/254
(58) Field of Classification Search ........ 709/220–222, 709/250, 227–228; 714/742; 370/254
See application file for complete search history.

(56) References Cited

U.S. PATENT DOCUMENTS

| | | | | |
|---|---|---|---|---|
| 6,052,380 | A * | 4/2000 | Bell | 370/445 |
| 6,788,508 | B2 * | 9/2004 | Papallo et al. | 361/64 |
| 2002/0157030 | A1 * | 10/2002 | Barker et al. | 713/320 |
| 2004/0030977 | A1 * | 2/2004 | Jiang et al. | 714/742 |
| 2006/0184698 | A1 * | 8/2006 | Conley et al. | 709/250 |

* cited by examiner

*Primary Examiner*—Moustafa Meky
(74) *Attorney, Agent, or Firm*—Sierra Patent Group, Ltd.

(57) ABSTRACT

Methods and apparatus for preventing unsupported links between a host device and a link partner over a network is disclosed. In one embodiment, a link control signal is employed to release the reset of the candidate PHY, place a candidate PHY of the host device in a boot state, determining whether the candidate PHY is fully functional, and release the candidate PHY to establish link with the link partner over the network.

9 Claims, 4 Drawing Sheets

METHOD AND APPARATUS OF PREVENTING PHYSICAL LAYER FROM ESTABLISHING UNSUPPORTED LINKS

BACKGROUND

1. Field of the Disclosure

The disclosure relates generally to data communications, and in particular, to Ethernet applications.

2. The Prior Art

With the proliferation of Internet-aware appliances, more and more devices may be coupled to the same network, many with customized applications embedded therein.

While PHYs are typically shipped to boot into a default state, these devices may be customized with onboard software to provide enhanced functionality and therefore may boot into a non-standard state.

In network systems, typically the PHY is responsible for establishing a link, and will begin the link process immediately after being released from reset. However, at this point, any customized software present may not be fully functional, even though the PHY is attempting to establish contact over the host network.

FIG. 1 illustrates this process. In act 10, the PHYs reset is released, and enters a programming state in act 15. The PHY simultaneously moves to establish link partners in act 20. Typically, act 20 may finish in advance of act 15.

As can be seen, a non-functional PRY may prematurely appear on the network, with other link partners believing it is a functional link while the programming state is still being performed, resulting in problematic links. Furthermore, the customized software may be programmed to configure the PHY or perform diagnostic tests on the system or network, possibly resulting in a negative impact on link partners.

BRIEF DESCRIPTION OF THE DRAWING FIGURES

DETAILED DESCRIPTION

Figure 1:
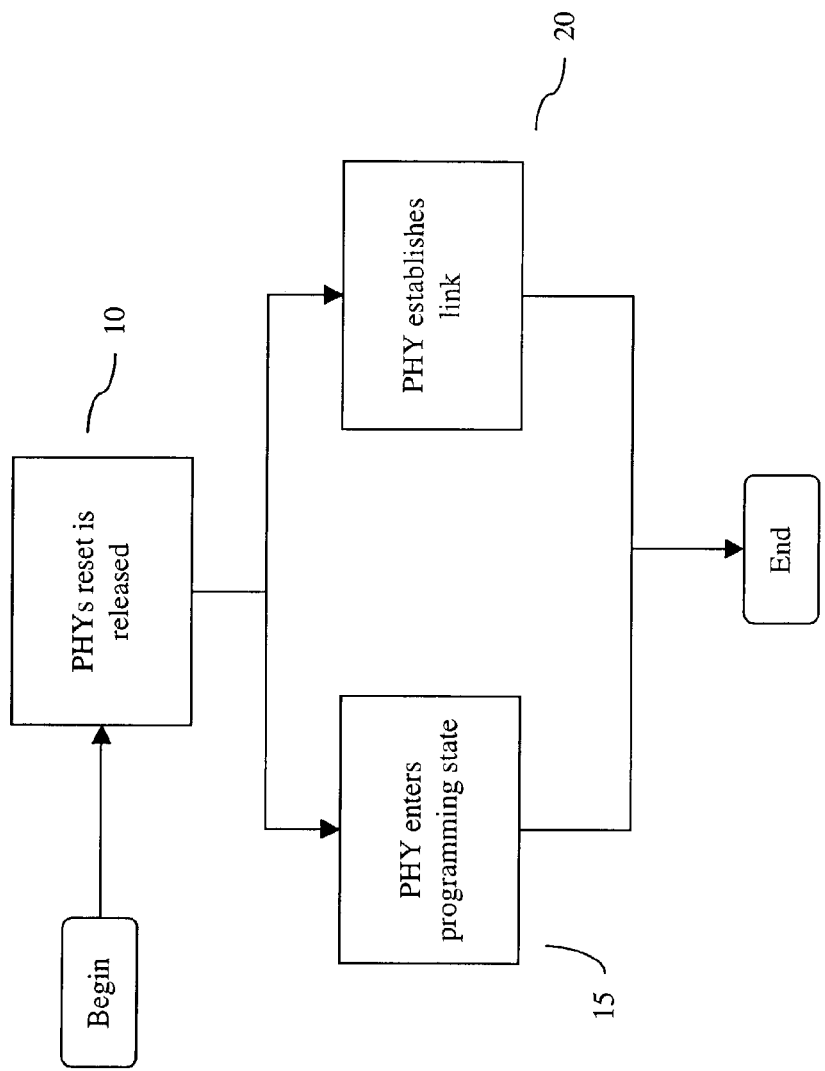
FIG. 1 is a flow block diagram of a method of PHY operation in prior art devices.

Persons of ordinary skill in the art will realize that the following description is illustrative only and not in any way limiting. Other modifications and improvements will readily suggest themselves to such skilled persons having the benefit of this disclosure. In the following description, like reference numerals refer to like elements throughout.

This disclosure may relate to data communications. Various disclosed aspects may be embodied in various computer and machine readable data structures. Furthermore, it is contemplated that data structures embodying the teachings of the disclosure may be transmitted across computer and machine readable media, and through communications systems by use of standard protocols such as those used to enable the Internet and other computer networking standards.

The disclosure may relate to machine readable media on which are stored various aspects of the disclosure. It is contemplated that any media suitable for retrieving instructions is within the scope of the present disclosure. By way of example, such media may take the form of magnetic, optical, or semiconductor media, and may be configured to be accessible by a machine as is known in the art.

Various aspects of the disclosure may be described through the use of flowcharts. Often, a single instance of an aspect of the present disclosure may be shown. As is appreciated by those of ordinary skill in the art, however, the protocols, processes, and procedures described herein may be repeated continuously or as often as necessary to satisfy the needs described herein.

Accordingly, the representation of various aspects of the present disclosure through the use of flowcharts should not be used to limit the scope of the present disclosure.

Figure 2:
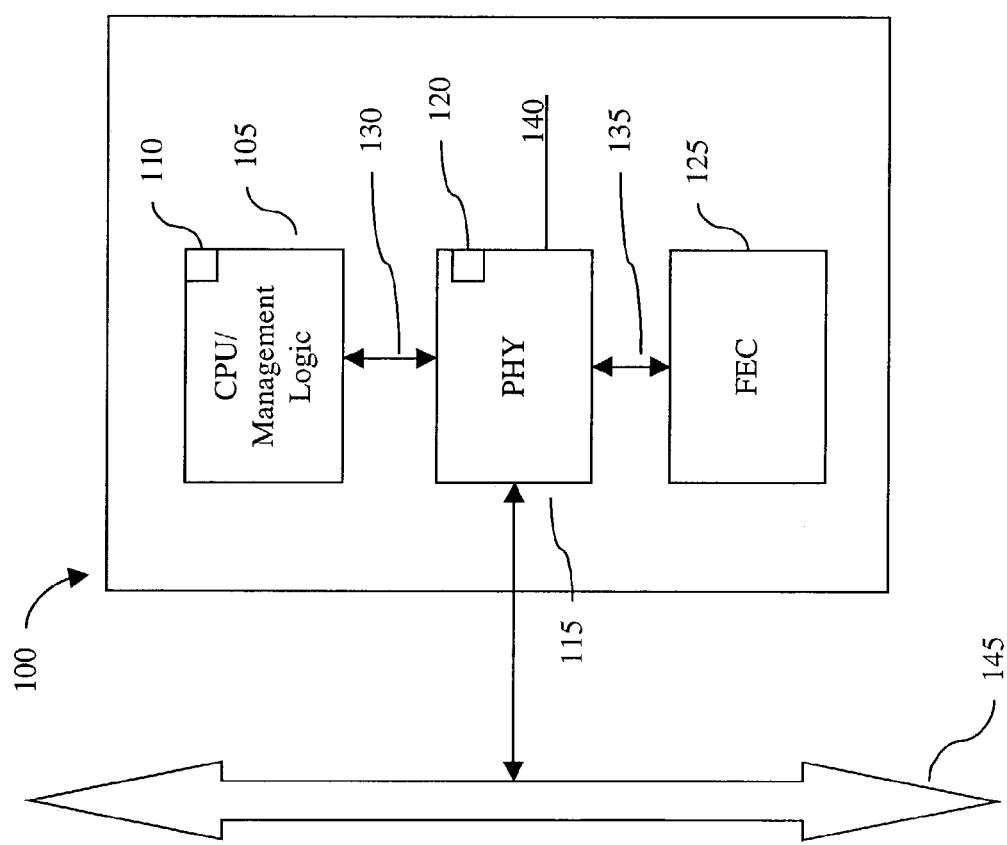
FIG. 2 is a conceptual block diagram of a host device configured in accordance with the teachings of this disclosure.

FIG. 2 is a conceptual block diagram of a host device 100 configured in accordance with the teachings of this disclosure. It is contemplated that a wide variety of host devices may be configured with the benefits of this disclosure, including any device capable of interfacing with an Ethernet-compliant medium 135. Examples of such devices include routers, switches, computers, peripherals, printers, and other such devices.

The host device 100 may include a CPU/Management Logic module 105 configured to control and operate the device. The CPU 105 may also include memory or other storage media 110 for storage and retrieval of embodiments of this disclosure.

The CPU 105 may be operatively coupled to a physical layer device 115, commonly referred to as a PHY, through a bus 130. It is contemplated that any PHY capable of being employed as a Ethernet transceiver may be employed in this disclosure. It is to be understood that any number of PHYs may be resident in the host device 100. The PHY 115 may include a processor 120 and associated memory as is known in the art to store, retrieve, and process embodiments of this disclosure.

It is contemplated that the bus 130 may include a wide variety of signals relating to the global function of the device, including such signals as a reset signal, a two-line signal known as a Management Data I/O (MDIO) bus, a power-on signal, and other such signals.

The PHY 115 may be coupled to a Fast Ethernet Controller 125 through an interface 135, such as a Media Independent Interface (MI) as is known in the art.

The PHY 115 is further configured to receive an additional link control signal 140, referred to herein as a Do Not Establish Link/OK to Establish Link signal, or link control signal for short. The link control signal 140 is used as disclosed herein to prevent a candidate PHY from establishing an unsupported link to a link partner through media 145. A candidate PHY is defined herein as a PHY that is attempting to establish a link through media 145, but has not yet done so, or is going through the process of rebooting after a reset or power-on sequence.

The operation of a PHY configured in accordance with this disclosure will now be disclosed.

Figure 3:
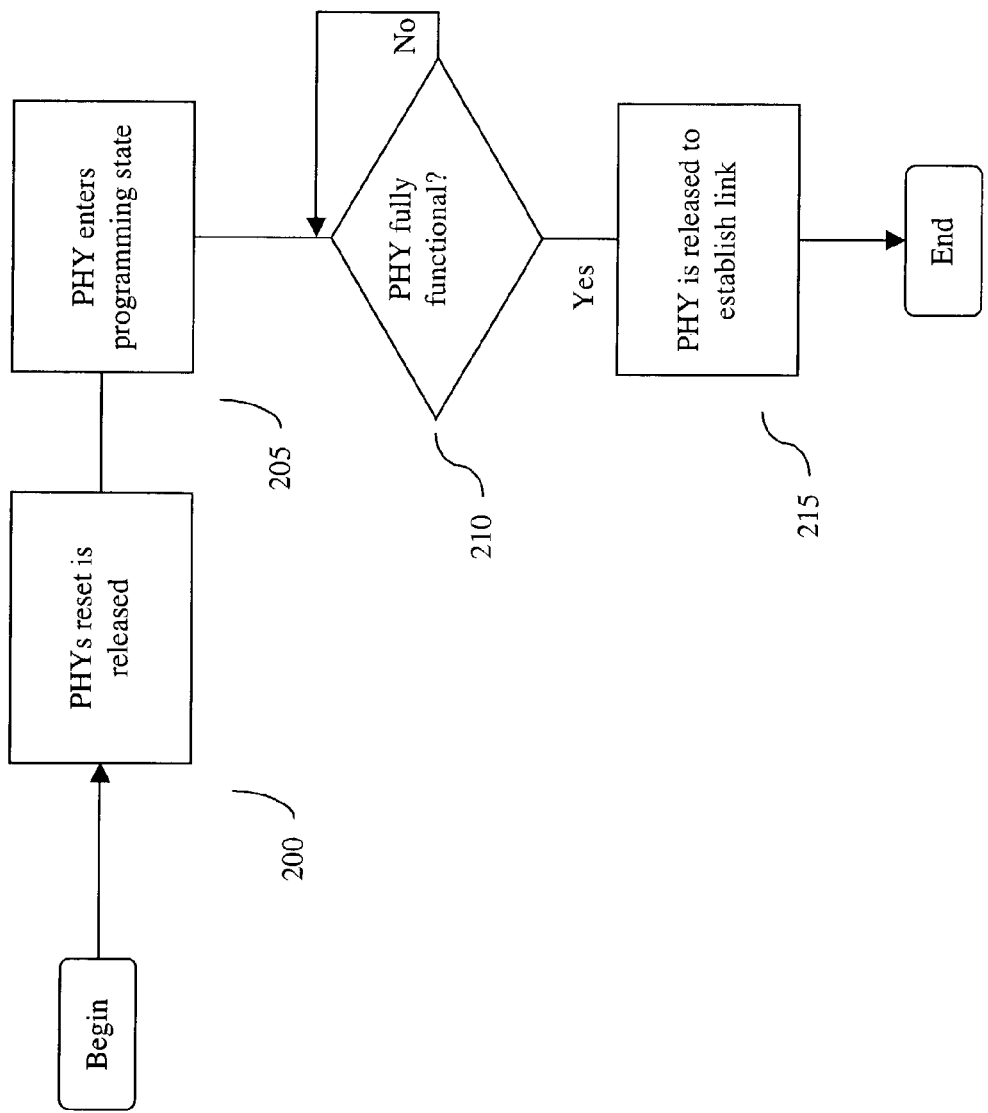
FIGS. 3 and 4 are flow block diagrams of disclosed methods for preventing unsupported links in accordance with the teachings of this disclosure.

Referring now to FIG. 3, a flow diagram of one disclosed embodiment of a method of preventing unsupported links is shown.

In act 200, the reset signal for the candidate PHY is released. The process then moves to act 205, where a candidate PHY has been placed in a boot sequence. It is contemplated that this may occur through any manner of ways, such as through a power-on sequence, a host device reset, or a user-initiated reset process. At this point, the link control signal is also placed in a Do Not Establish Link state.

As will be appreciated by those of ordinary skill in the art, normally at this point the candidate PHY will also attempt to establish a link with a link partner. However, in this disclosure the process moves to, act 210, where the device determines whether the PHY is fully functional.

When the candidate PHY is determined to be fully functional, the process moves to act 215, where the link control line is placed in an OK to Establish Link state, releasing the candidate PHY to safely form a link with a link partner.

As will be appreciated by those skilled in the art, through the benefit of this disclosure the candidate PHY is allowed to move to a fully functional state prior to establishing a link, with the link control signal being maintained in a Do Not Establish Link state by the host device. Hence, through the use of the link control signal, the PHY of this disclosure is prevented from establishing a link until it is fully functional.

As will be appreciated by those of ordinary skill in the art, the host device 100 may perform power-on processing, such as PHY programming and network testing, without the possibility of unsupported links being established. It is contemplated that any number of PHYs present in the host system may be controlled using the benefits of this disclosure.

It is contemplated that the link control status of this disclosure may be implemented in a PHY through different means. For example, as illustrated in FIG. 2, the link control signal may be operated under external control, such as by the host device.

Alternatively, the link control status may be available internal to the PHY, such as through the use of internal memory registers that may be configured to indicate when the PHY is fully functional and prepared to establish link. In this embodiment, the link control status of the PHY may be polled and controlled through the use of the MDIO bus.

As will be appreciated, typically it is the host CPU that determines whether it is proper to establish link using the teaching of this disclosure. Hence, using the benefits of this disclosure, link control may be implemented in a variety of ways including a link control signal or accesses through MDIO or equivalent control bus to internal registers.

Furthermore, to insure that PHYs configured in accordance with this disclosure are backward-compatible, the link control function may be available via a pin on the IC package in which the PHY is provided. For customers who wish the PHY to be immediately available to establish link, the pin may be strapped in an OK to Establish Link state using means well known in the art.

Figure 4:
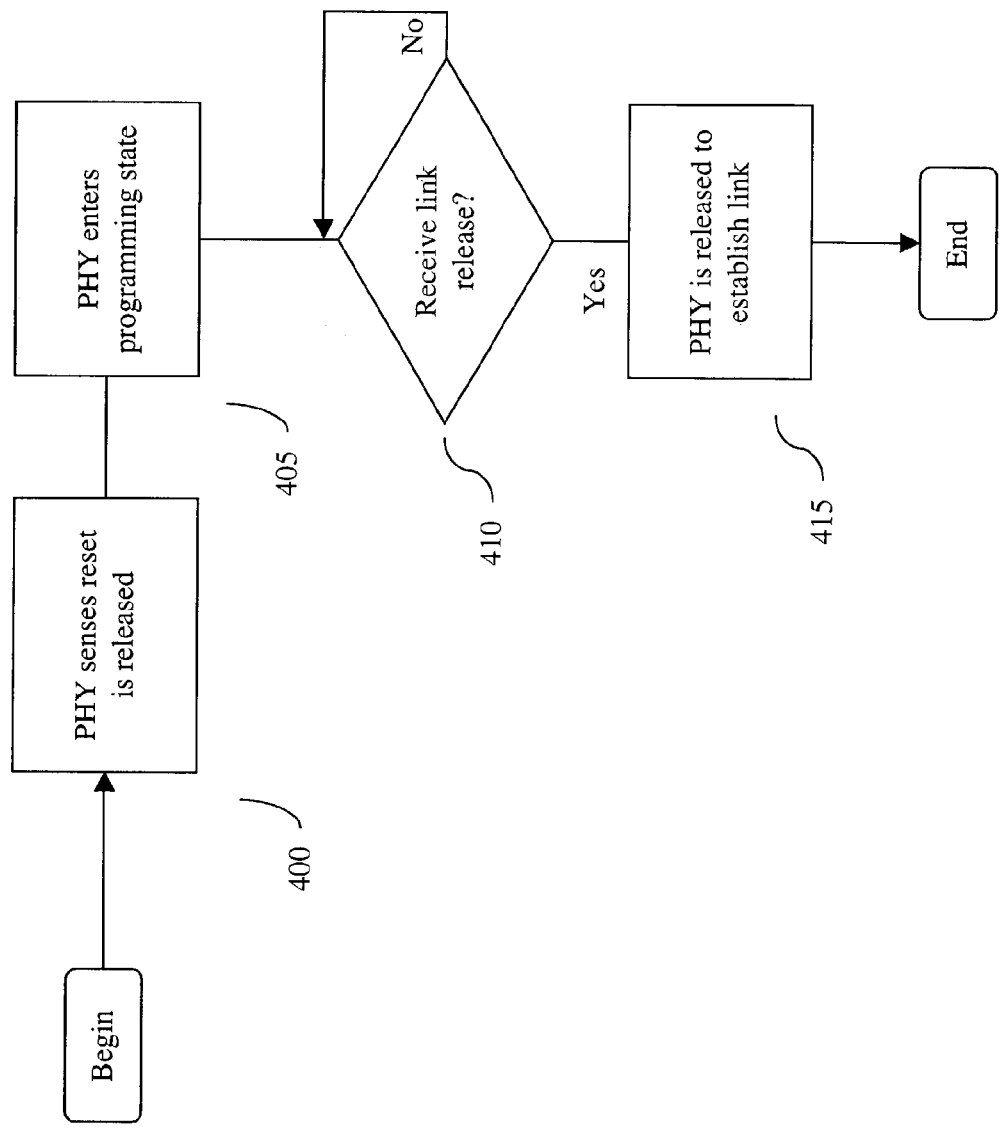

FIG. 4 is a flow diagram of a further disclosed method from the PHY's perspective. In FIG. 4, the PHY may sense that its reset has been released in act 400, then moving to a programming state in act 405. In act 410, the PHY is configured to wait for an indication from the host device that the PHY may move to establish link with a link partner. If no indication is sensed by the PHY, the PHY may loop and wait as shown by query 415. Once an indication is received, such as an OK to Establish Link indication, the process may move to act 415, where the PHY may safely establish link with a link partner.

While embodiments and applications of this disclosure have been shown and described, it would be apparent to those skilled in the art that many more modifications and improvements than mentioned above are possible without departing from the inventive concepts herein. The disclosure, therefore, is not to be restricted except in the spirit of the appended claims.

What is claimed is:

1. A method for preventing unsupported links between a candidate PHY within a host device and a link partner over a network, said method comprising:
   releasing the reset of said candidate PHY;
   placing a candidate PHY of the host device in a boot state;
   determining whether said candidate PHY is fully functional; and
   releasing the candidate PHY to establish link with the link partner over the network;
   wherein said act of allowing the candidate PHY to become fully functional further comprises:
      providing a control indication coupled between said host device and said candidate PHY, said control indication being in a Do Not Establish Link state;
      determining, by said host device, when said candidate PHY is fully functional; and
      when said candidate PHY is fully functional, placing, by said host device, said control indication in an OK to Establish Link state.

2. An apparatus for preventing unsupported links between a candidate PHY within a host device and a link partner over a network, said apparatus comprising:
   means for releasing the reset of said candidate PHY;
   means for placing a candidate PHY of the host device in a boot state;
   means for determining whether said candidate PHY is fully functional; and
   means for releasing the candidate PHY to establish link with the link partner over the network;
   wherein said apparatus further comprises:
      means for providing a control indication coupled between said host device and said candidate PHY, said control indication being in a Do Not Establish Link state;
      means for determining, by said host device, when said candidate PHY is fully functional; and
      means for placing said control indication in an OK to Establish Link state when said candidate PHY is fully functional.

3. An apparatus for preventing unsupported links between a candidate PHY within a host device and a link partner over a network, said apparatus comprising:
   a microprocessor operatively disposed within said host device, said microprocessor being configured to:
   release the reset of said candidate PHY;
   place a candidate PHY of the host device in a boot state;
   determine whether said candidate PHY is fully functional; and
   release the candidate PHY to establish link with the link partner over the network;
   wherein said microprocessor is further configured to:
      provide a control indication coupled between said host device and said candidate PHX, said control indication being in a Do Not Establish Link state;
      determine, by said host device, when said candidate PHY is fully functional; and
      place said control indication in an OK to Establish Link state when said candidate PHY is fully functional.

4. The apparatus of claim 3, wherein said candidate PHY is disposed within an IC package, and said control indication is provided via a pin on said IC package.

5. A program storage device readable by a machine, tangibly embodying a program of instructions executable by the machine to perform a method of preventing unsupported links between a candidate PHY within a host device and a link partner over a network, the method comprising:

releasing the reset of said candidate PHY;
placing a candidate PHY of the host device in a boot state;
determining whether said candidate PHY is fully functional; and
releasing the candidate PHY to establish link with the link partner over the network;
wherein said act of allowing the candidate PHY to become fully functional further comprises:
providing a control indication coupled between said host PHY and said candidate device, said control indication being in a Do Not Establish Link state;
determining, by said host device, when said candidate PHY is fully functional; and
when said candidate PHY is fully functional, placing, by said host device, said control indication in an OK to Establish Link state.

6. A method for preventing unsupported links between a candidate PHY within a host device and a link partner over a network, said method comprising:
providing a control indication coupled between said host device and said candidate device, said control indication being in a Do Not Establish Link state;
sensing, by said PHY, the release of the reset of said candidate PHY;
entering, by said PHY, into a boot state;
waiting, by said PHY, for an OK to Establish Link state control indication from said host device; and
when said indication is sensed by said PHY, establishing link with a link partner over the network.

7. An apparatus for preventing unsupported links between a candidate PHY within a host device and a link partner over a network, comprising:
a control indication coupled between said host device and said candidate device, said control indication being in a Do Not Establish Link state; said PHY being configured to:
sense the release of the reset of said candidate PHY;
enter into a boot state;
wait for an OK to Establish Link state control indication from said host device; and
when said indication is sensed by said PHY, establish link with a link partner over the network.

8. A program storage device readable by a machine, tangibly embodying a program of instructions executable by the machine to perform a method of preventing unsupported links between a candidate PHY within a host device and a link partner over a network, the method comprising:
providing a control indication coupled between said host device and said candidate device, said control indication being in a Do Not Establish Link state;
sensing, by said PHY, the release of the reset of said candidate PHY;
entering, by said PHY, into a boot state;
waiting, by said PHY, for an OK to Establish Link state control indication from said host device; and
when said indication is sensed by said PHY, establishing link with a link partner over the network.

9. An apparatus for preventing unsupported links between a candidate PHY within a host device and a link partner over a network, comprising:
means for providing a control indication coupled between said host device and said candidate device, said control indication being in a Do Not Establish Link state;
means for sensing the release of the reset of said candidate PHY;
means for entering into a boot state;
means for waiting for an OK to Establish Link state control indication from said host device; and
means for establishing link with a link partner over the network when said indication is sensed by said PHY.

* * * * *

UNITED STATES PATENT AND TRADEMARK OFFICE
CERTIFICATE OF CORRECTION

| | | |
|---|---|---|
| PATENT NO. | : 7,373,421 B2 | Page 1 of 1 |
| APPLICATION NO. | : 10/460939 | |
| DATED | : May 13, 2008 | |
| INVENTOR(S) | : Jason Visneski and Chris Desiniotis | |

It is certified that error appears in the above-identified patent and that said Letters Patent is hereby corrected as shown below:

On the Title Page Item (75) Inventor section, change "Jason Visenski" to -- Jason Visneski --

Signed and Sealed this

Fifteenth Day of July, 2008

JON W. DUDAS
*Director of the United States Patent and Trademark Office*